(No Model.)
H. FENTON.
UNIVERSAL PIPE JOINT.
No. 379,947. Patented Mar. 27, 1888.
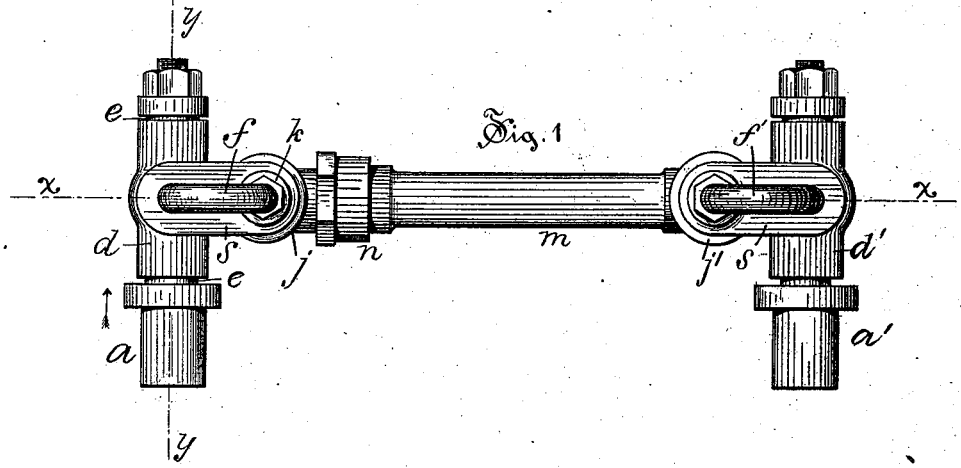
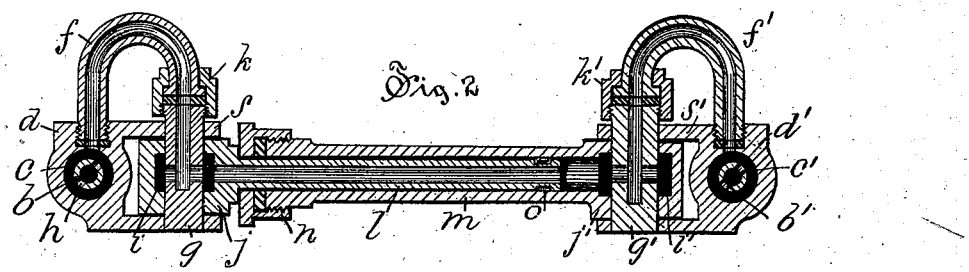
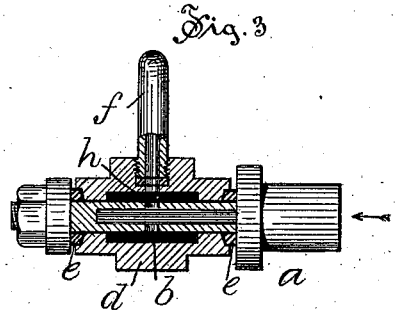
Witnesses:
H. R. Williams
W. M. Bjorkman
Inventor
Horace Fenton.
By Simonds & Burdett
Att'ys

UNITED STATES PATENT OFFICE.

HORACE FENTON, OF WETHERSFIELD, CONNECTICUT.

UNIVERSAL PIPE-JOINT.

SPECIFICATION forming part of Letters Patent No. 379,947, dated March 27, 1888.

Application filed June 23, 1887. Serial No. 242,218. (No model.)

*To all whom it may concern:*

Be it known that I, HORACE FENTON, of Wethersfield, in the county of Hartford and State of Connecticut, have invented a certain new and useful Improvement in Universal Pipe-Joints, of which the following is a description, reference being had to the accompanying drawings, wherein—

Figure 1 is a side view of the entire joint. Fig. 2 is a view in horizontal section of the parts shown in Fig. 1 on the section $x\ x$. Fig. 3 is a view in detail, mainly in vertical section, on the plane $y\ y$.

The object of this improvement is the production of a joint or coupling connecting steam-pipes which allows entire freedom of motion between fixed pipes. This device is useful as a connection for carrying steam, hot air, or the like from one railroad-car to another.

The letter $a$ denotes what would be ordinarily a fixed pipe attached to a railway-car, and generally projecting downward from the car, although in Fig. 1 the projection is upward. Steam flowing through the pipe $a$ in the direction indicated by the arrow escapes laterally through perforations $b$ into a chamber, $c$, which is a part of the sleeve $d$, which is rotary on pipe $a$, being packed at the ends by packing $e$. From the chamber $c$ the steam passes through the duct $f$ into the hollow shaft $g$, and through perforations $h$ into the chamber $i$, within and a part of the chambered piece $j$. The ends of this hollow shaft just mentioned form trunnions for the chambered piece $j$, whereby the chambered piece $j$ is rotarily hung in the bifurcations $s$, which are carried by the sleeve $d$. This shaft $g$ and chambered piece $j$ are pinned together, so as to rotate together. Where the duct $f$ connects with the hollow shaft $g$ there is a stuffing-box, $k$, to prevent leakage of the fluid. The pipe $a'$ is substantially a duplicate of the pipe $a$; the sleeve $d'$ is substantially a duplicate of the sleeve $d$; the duct $f'$ is substantially a duplicate of the duct $f$; the hollow shaft $g'$ is substantially a duplicate of the hollow shaft $g$; the chambered piece $j'$ is substantially a duplicate of the chambered piece $j$, and the bifurcations $s'$ are substantial duplicates of the bifurcations $s$.

The letter $l$ denotes what may well be called a "male pipe," appurtenant to the chambered piece $j'$, and $m$ denotes what may well be called a corresponding "female pipe," appurtenant to the chambered piece $j$. The male pipe $l$ fits within the female pipe $m$, giving freedom of lengthwise motion. The female pipe $m$ is furnished with a stuffing-box, $n$, and the end of the male pipe is furnished with a packing-ring, $o$, which might be rubber or the like, but is preferably of metal, and of a construction like to that of the ordinary piston-head in a steam-engine.

Cases may arise in which it may be desirable to have some ordinary form of coupling on the male pipe $l$ just where it joins the chambered piece $j'$, or to have a similar ordinary coupling on the female pipe $m$ where it joins the chambered piece $j$; but I do not claim such features as a part of my invention.

I claim as my improvement—

1. In combination, the pipe $a$, having perforations $b$, the chambered sleeve $d$, rotary on said pipe and carrying bifurcations $s$, and the chambered piece $j$, hung by trunnions in such bifurcations and having its chamber communicating with said duct, all substantially as described, and for the purpose set forth.

2. In combination, the two pipes $a\ a'$, the chambered sleeves $d\ d'$, respectively rotary on said pipes and carrying, respectively, the bifurcations $s\ s'$, the chambered pieces $j\ j'$, rotarily hung in the respective bifurcations, the male pipe $l$, appurtenant to the chambered piece $j'$, and the female pipe $m$, appurtenant to the chambered piece $j$, all substantially as described, and for the purpose set forth.

HORACE FENTON.

Witnesses:
A. B. JENKINS,
G. W. ROYCE.